Patented Jan. 8, 1929.

1,697,910

UNITED STATES PATENT OFFICE.

ERNEST FOURNEAU, OF PARIS, FRANCE.

SOLUTION OF AMMONIUM SALT OF HYDROXYACETYLAMINOPHENYLARSENIC ACID.

No Drawing. Original application filed January 18, 1927, Serial No. 161,967, now Patent No. 1,677,964, dated July 24, 1928, and in France January 19, 1926. Divided and this application filed December 30, 1927. Serial No. 243,767.

This application is a division of my United States Patent No. 1,677,964 of July 24, 1928.

This parent application relates to a method of preparing a water-soluble salt of the hydroxyacetylaminoarsenic acid and aims to provide a simple inexpensive procedure starting from materials less costly than those used in preparing the amine salts.

The present application relates to a method of preparing solutions of organic arsenicals.

An illustrative procedure is the following:

One gram of the ammonium salt is dissolved in the quantity of water necessary to yield the desired concentration (generally 2 to 4 cc.). A solution of sodium sulfite $SO^3Na^2$ containing about 2 gms. of sulphite to 4 cc. of water is prepared separately and a drop of this solution is added to the solution of the ammonium salt.

Ampuls prepared by the foregoing procedure are perfectly colorless and may be sterilized without deterioration.

Having now particularly described and ascertained the nature of my said invention, and in what manner the same is to be performed, I declare that what I claim is:—

1. A composition of matter containing water, the ammonium salt of hydroxyacetylaminophenylarsenic acid; and an alkali salt of a reducing acid.

2. A composition of matter containing water, the ammonium salt of hydroxyacetylaminophenylarsenic acid; and an alkali salt of sulphurous acid.

In testimony whereof I affix my signature.

ERNEST FOURNEAU.